June 25, 1957
A. BRADLEY
2,796,882
FLUSH DRAIN VALVE
Filed Dec. 22, 1953
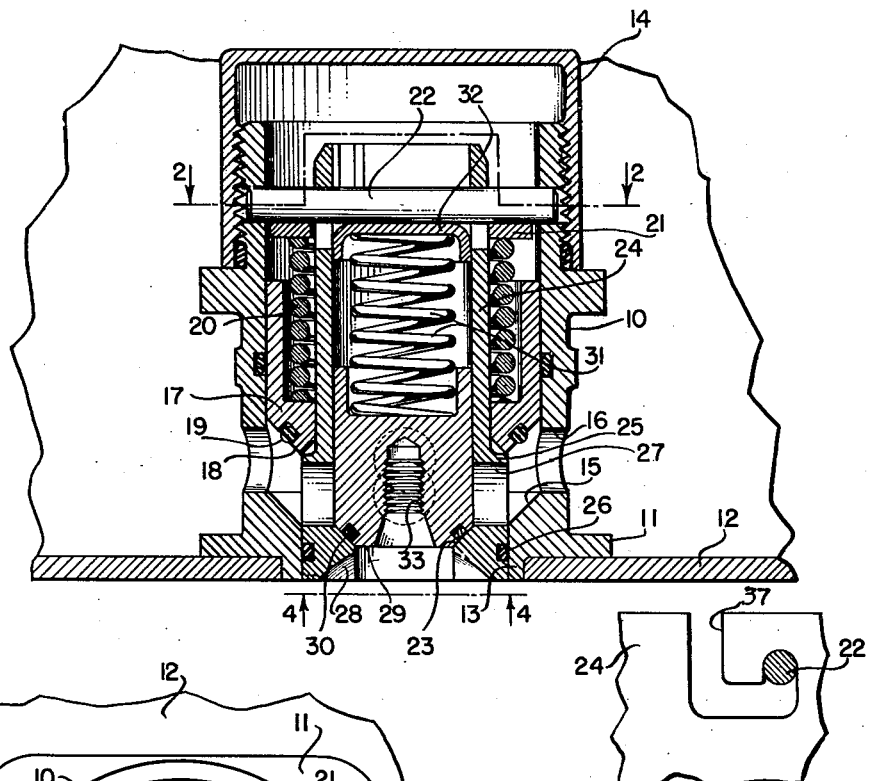
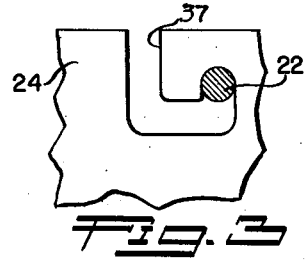
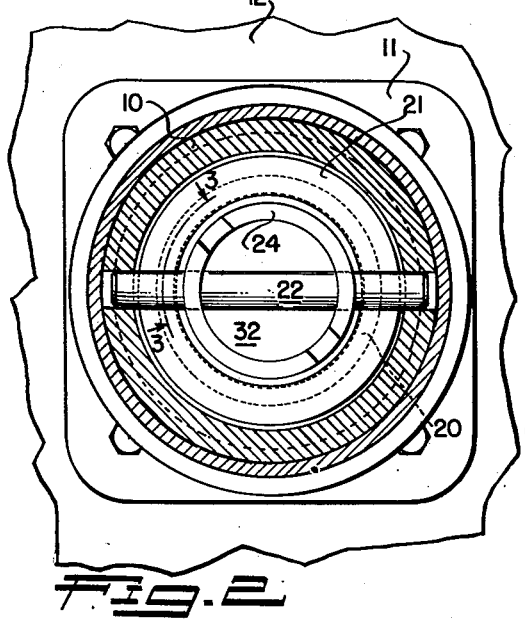
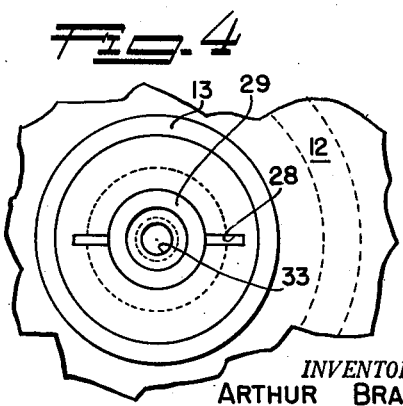
INVENTOR.
ARTHUR BRADLEY
BY
*George C. Sullivan*
Agent United States Patent Office 2,796,882
Patented June 25, 1957

2,796,882
FLUSH DRAIN VALVE

Arthur Bradley, Woodland Hills, Calif., assignor to Lockheed Aircraft Corporation, Burbank, Calif.

Application December 22, 1953, Serial No. 399,704

9 Claims. (Cl. 137—329.4)

This invention relates to an improved drain valve of the externally flush type particularly for use with integral fluid tanks in airplanes where the airplane or wing contour forms the bottom wall of the tank.

Where the tank is separate from the airplane skin or contour, a poppet type drain cock can be used inside of an access door in the airplane skin, but where the tank utilizes the airplane skin for its wall or bottom, a flush type drain is required for aerodynamic cleanness. In either type of drain arrangement the tank must be fully drained to allow the valve assembly to be removed in order to replace the sealing elements. It is accordingly an object of this invention to provide an improved flush drain valve wherein the sealing elements can be removed and replaced without emptying the tank, where this operation can be done without requiring personnel to enter the tank to obtain access to the valve parts, and wherein the resulting drain valve will serve to drain the tank to the lowest possible level in its normal operation.

It is a further object of this invention to provide a flush type drain valve of the type described wherein a primary poppet valve and seat are combined with a secondary poppet and its seat in coaxial telescoping relationship, such that the primary poppet is used as a drain valve and is removable with its seat from the secondary valve and its seat to allow the secondary valve to seat with a minimum leakage during the removal or replacement of the primary valve. With this arrangement the primary seat and sealing means can be repaired or replaced at will without completely draining the tank and removing the entire valve structure therefrom.

It is another object of this invention to provide an externally flush drain valve for the purpose described wherein the primary valve parts are removable from the valve housing from the outside, and where a secondary seal is provided to close the drain openings upon such removal of the primary valve.

Other objectives and features of the invention will become apparent from the following detailed description of typical preferred embodiments throughout which description reference is made to the accompanying drawings in which:

In the drawings:

Figure 1 is an enlarged central section through a drain valve embodying the features of this invention;

Figure 2 is a section on the line 2—2 of Figure 1;

Figure 3 is a developed view of the bayonet latch and the line 3—3 of Figure 2; and Figure 4 is a bottom or outside view of the valve as installed in a tank wall.

As shown:

A cylindrical valve housing 10 is provided with a peripheral mounting flange 11 at one end to fit a hole in a fuel tank or other fluid container 12, with the open end 13 of the housing flush with the bottom of the tank. The other end of the housing 10 has a sealing cap 14 applied thereto. Interiorly of the housing 10, near the open end 13, is a valve seat 15 with a plurality of ports 16 through the wall of the housing forming drain openings for the tank. An annular valve member 17 has a valve face 18 cooperating with the seat 15 and has an O-ring 19 in a groove in the face to make sealing contact with the seat 15. When the primary valve, to be later described, is removed, the annular valve 17 is urged against its seat 15 by a spring 20 backed by a washer 21, which washer bears against a cross pin 22 diametrically disposed in the housing 10.

A primary valve seat 23 is formed interiorly of a sleeve 24 having an external collar 25 fitting in the open end 13 of the housing and having an O-ring seal 26 for the joint. The collar area also has ports 27 therein above the seat 23 for draining the tank when the seat 23 is uncovered. The sleeve 24 has a bayonet slot 37 for engaging the cross pin 22, as shown in Figure 3, a keyway 28 across the open end of the sleeve allowing the sleeve to be pushed into the housing to engage the slot 37 with the pin 22 and then rotated to lock the sleeve in place. Such insertion of the sleeve 24 causes the edge of the collar 25 to lift the annular valve member 17 off its seat into the position of Figure 1. This action transfers the load of the spring 20 through the valve member 17 to the collar on the sleeve 24, thus producing pressure on the latter to keep the bayonet lock 37 secure.

Prior to inserting the sleeve 24 in the open end of the housing 10 a poppet valve 29 is inserted in the sleeve, with an O-ring 30 making sealing contact with the seat 23 in the sleeve, a spring 31 is interposed between the poppet and a spring cap 32, the cap bearing against the cross pin 22 and compressing the spring 31 when the sleeve 24 is inserted in the housing 10.

In the normal operation of the drain valve of this invention the poppet valve 29 is manually unseated to drain the tank in the conventional manner. In the event of leakage past the valve seat O-ring 30 the entire sleeve 24 and poppet valve assembly can be removed from the housing by disengaging the bayonet joint slot 37 from the pin 22. In the event the sleeve sticks at the housing end 13, a screw or bolt can be inserted in the tapped hole 33 in the exposed end of the poppet 29 to pull the sleeve out, although ordinarily the two valve springs 20 and 31 exert sufficient force to expel the sleeve and force the secondary valve 17 to its seat as the sleeve is being removed. The action of the valve 17 assures against leakage of the tank contents during and after the removal of the sleeve, thus permitting replacement of the O-ring valve seals 30 and 26.

Having thus described my invention and the present preferred embodiment thereof, I desire to emphasize the fact that many modifications may be resorted to in a manner limited only by a just interpretation of the following claims.

I claim:

1. A removable flush drain valve for a fluid tank comprising a cylindrical housing mounted through the wall of the tank, said housing having drain apertures in the wall thereof and a valve seat therein between the apertures and the end of the housing extending through the tank wall, a sleeve valve slidable in said housing to engage the valve seat in one position thereof, a sleeve coaxial with said sleeve valve having drain apertures through the wall thereof and carrying a primary valve seat interposed between the sleeve drain apertures and the exposed end of the sleeve, means removably retaining the sleeve in the housing in a position where said shoulder holds the sleeve valve open, a primary poppet valve engageable with the valve seat in said sleeve, said sleeve having a shoulder thereon arranged to engage and open said sleeve valve when said sleeve is in position in said housing and to allow said sleeve valve to engage its seat in the housing when said sleeve is removed, and springs urging the sleeve valve and poppet valve toward their respective seats.

2. A drain valve as described in claim 1 wherein said means for removably retaining the sleeve includes a cross pin extending diametrically of the housing and the sleeve is provided with bayonet slots engageable with said cross pin to retain it in position while permitting ready removal of the sleeve and poppet valve from the housing externally of the tank.

3. A drain valve as described in claim 2 wherein the sleeve valve and poppet valve are separately urged towards their seats by their respective springs bearing against the cross pin.

4. A drain valve fitting flush with the external surface of a fluid tank comprising a housing mounted internally of the tank and having an opening flush with the exterior thereof, coaxial primary and secondary valves in said housing comprising a secondary sleeve valve engageable with a valve seat in said housing, a sleeve within said sleeve valve having a shoulder arranged to unseat said valve and itself having an internal seat, a primary poppet valve seating against the seat in said sleeve, and means for retaining said sleeve in a position within said housing whereby the sleeve holds the sleeve valve unseated.

5. A drain valve as specified in claim 4 wherein the means for retaining the sleeve in the housing comprises a cross pin through the housing walls and bayonet slots in the sleeve engageable with said cross pin.

6. A drain valve as specified in claim 4 wherein the sleeve valve and poppet valve are urged towards their seats by coaxial springs arranged to eject the poppet valve and sleeve from the housing when the retaining means for the sleeve is released.

7. A flush drain valve for a fluid tank, comprising a cylindrical housing mounted interiorly of the tank about an aperture through the tank bottom, said housing having drain apertures in the wall thereof, a sealing cap applied to the inboard end of the housing, a concentric valve seat in the housing between the apertures therein and the open end of the housing, a sleeve valve slidable in said housing to engage said valve seat, a sleeve member coaxial with and positioned within said sleeve valve, said sleeve member having apertures in the wall thereof in communication with the housing apertures when the aforesaid sleeve valve is moved away from its seat in the housing, a collar surrounding said sleeve member arranged to unseat said sleeve valve, means to releasably retain said sleeve valve in a position such that the sleeve valve is unseated, a primary poppet valve within said sleeve valve and removable therewith, and a valve seat formed within said sleeve member for cooperation with said poppet valve.

8. A drain valve as defined in claim 7 wherein springs urge the sleeve valve and poppet valve to their seats and help eject the sleeve member from the housing when said sleeve member retaining means is released.

9. A drain valve as defined in claim 7, wherein the means for retaining the sleeve in the housing comprises a cross pin through the housing walls and bayonet slots in the sleeve engageable with said cross pin.

References Cited in the file of this patent

UNITED STATES PATENTS

| | | |
|---|---|---|
| 807,269 | Hildebrand | Dec. 12, 1905 |
| 1,379,840 | Smith | May 31, 1921 |
| 1,508,291 | Penfield | Sept. 9, 1924 |
| 2,265,496 | Shaw | Dec. 9, 1941 |
| 2,655,932 | Lipman | Oct. 20, 1953 |